US010017250B2

(12) United States Patent
Colosimo

(10) Patent No.: US 10,017,250 B2
(45) Date of Patent: Jul. 10, 2018

(54) RECONFIGURABLE VEHICLE DOORS

(71) Applicant: BAE Systems plc, London (GB)

(72) Inventor: Nicholas Giacomo Robert Colosimo, Preston (GB)

(73) Assignee: BAE Systems plc, London (GB)

( * ) Notice: Subject to any disclaimer, the term of this patent is extended or adjusted under 35 U.S.C. 154(b) by 135 days.

(21) Appl. No.: 15/030,230

(22) PCT Filed: Oct. 17, 2014

(86) PCT No.: PCT/EP2014/072355
§ 371 (c)(1),
(2) Date: Apr. 18, 2016

(87) PCT Pub. No.: WO2015/055834
PCT Pub. Date: Apr. 23, 2015

(65) Prior Publication Data
US 2016/0244164 A1    Aug. 25, 2016

(30) Foreign Application Priority Data

Oct. 18, 2013  (GB) .................................. 1318529.3
Mar. 20, 2014  (EP) .................................. 14275078

(51) Int. Cl.
*B64D 1/06* (2006.01)
*F41A 9/26* (2006.01)
*E05D 15/02* (2006.01)

(52) U.S. Cl.
CPC .............. *B64D 1/06* (2013.01); *E05D 15/02* (2013.01); *F41A 9/26* (2013.01); *E05Y 2900/502* (2013.01)

(58) Field of Classification Search
CPC . B64D 1/06; B64D 7/00–7/08; B64C 1/1407; B64C 1/1461; B60J 5/047; E05D 15/02; F41F 3/06
See application file for complete search history.

(56) References Cited

U.S. PATENT DOCUMENTS 2,546,823 A * 3/1951 Holloway ................. F41A 9/04
                                                89/1.801
2,634,656 A * 4/1953 Woollens ................. B64D 1/04
                                                244/129.5

(Continued)

FOREIGN PATENT DOCUMENTS

EP    2127927 A1    12/2009
EP    2862796 A1 *  4/2015  ........... B64C 1/1407

(Continued)

OTHER PUBLICATIONS

McDonnell F-101 Voodoo Wikipedia, Oct. 14, 2013 https://en.wikipedia.org/w/index.php?title=McDonnell_F-101_Voodoo&oldid=577144022.*

(Continued)

*Primary Examiner* — Joseph W Sanderson
(74) *Attorney, Agent, or Firm* — Maine Cernota & Rardin

(57) ABSTRACT

A vehicle includes a reconfigurable door having a first surface and a second surface. There is also an arrangement for configuring the door so that in a first configuration at least part of the first surface is external to the vehicle, and in a second configuration at least part of the second surface is external to the vehicle. The first surface and/or the second surface includes at least one device mounting arrangement.

12 Claims, 4 Drawing Sheets

(56) References Cited

U.S. PATENT DOCUMENTS

| | | | | |
|---|---|---|---|---|
| 2,731,885 | A * | 1/1956 | Nolan | B64D 1/06 89/1.806 |
| 2,856,181 | A * | 10/1958 | Fenton | B64D 1/06 49/253 |
| 2,947,533 | A * | 8/1960 | Brumby | B64D 1/04 244/129.5 |
| 2,979,991 | A * | 4/1961 | Buschers | B64D 1/04 89/1.51 |
| 3,765,626 | A * | 10/1973 | Maynard | B64D 37/04 244/129.5 |
| 4,214,721 | A * | 7/1980 | Burhans, Jr. | B64D 37/04 220/6 |
| 4,333,384 | A * | 6/1982 | Arnold | B64D 1/06 244/137.4 |
| 4,637,292 | A | 1/1987 | Peterson | |
| 4,681,013 | A * | 7/1987 | Farley | B64D 1/06 89/1.804 |
| 4,785,710 | A * | 11/1988 | Schofield | B64D 7/08 89/1.801 |
| 5,257,758 | A | 11/1993 | Hassel | |
| 8,398,026 | B2 * | 3/2013 | Walton | B64D 1/06 244/102 R |
| 2009/0295188 | A1 * | 12/2009 | Kahn | B60J 5/047 296/146.12 |
| 2010/0140406 | A1 * | 6/2010 | Walton | B64C 1/1415 244/129.5 |

FOREIGN PATENT DOCUMENTS

| | | |
|---|---|---|
| GB | 801110 A | 9/1958 |
| JP | H08295295 A | 11/1996 |
| WO | 2005039972 A2 | 5/2005 |

OTHER PUBLICATIONS

EP Search Report dated Sep. 12, 2014 of Patent Application No. EP14275078.5 filed Mar. 20, 2014.

GB Search Report dated May 24, 2014 of Patent Application No. GB1318529.3 filed Oct. 18, 2013.

PCT Search Report dated Sep. 7, 2015 of PCT Application No. PCT/EP2014/072355 filed Oct. 17, 2014.

\* cited by examiner

RECONFIGURABLE VEHICLE DOORS

RELATED APPLICATIONS

This application is a national phase application of PCT Application No. PCT/EP2014/072355 filed on Oct. 17, 2014, which claims priority from Great Britain Application No. GB 1318529.3 filed Oct. 18, 2013 and European Application No. EP 14275078.5 filed Mar. 20, 2014. Each of these applications is herein incorporated in their entirety for all purposes.

The present invention relates to reconfigurable vehicle doors.

BACKGROUND

Vehicles, such as aircraft, often include various devices on their external surfaces. Examples of such items include sensors, weapon mountings and cameras. Such externally projecting devices can have disadvantages in terms of reducing aerodynamics and increasing radar cross section (thereby making the aircraft less stealthy). External formations can be used by hostile parties to obtain a radar signature that can assist with identifying the aircraft. Conventional aircraft weapon bays have large doors that open outwardly to allow a weapon to be positioned outside the aircraft. Such apparatus is large and susceptible to being detected by radar.

Further, external real estate on particular types of vehicles may be limited and so it can be difficult to fit several external items.

SUMMARY

Embodiments of the present invention are intended to address at least some of the problems discussed above.

According to a first aspect of the present invention there is provided a vehicle including or comprising:

a reconfigurable door having a first surface and a second surface, and an arrangement for configuring the door so that in a first configuration at least part of the first surface is external to the vehicle, and in a second configuration at least part of the second surface is external to the vehicle, wherein the first surface and/or the second surface includes at least one device mounting arrangement.

In some embodiments, one of the surfaces may be flat and not include any formation that projects beyond at least part of a surrounding external surface/skin of the vehicle. The surface may be flush/aligned with at least part of a surrounding external surface/skin of the vehicle.

The arrangement for configuring the door may be pivotable. An axis of rotation of the pivotable arrangement for configuring the door may correspond to a main axis of the vehicle.

At least one dimension of the door may correspond to a dimension of the device.

The vehicle may further include a transfer system for transferring at least one device to a said mounting arrangement. The transfer system may include a plurality of storage locations for, in use, holding a said device and may be arranged to position a said storage location, e.g. sequentially, adjacent to a said mounting arrangement. The transfer system may include a carousel-type arrangement for sequentially positioning the plurality of storage locations adjacent to a said mounting arrangement. The carousel-type arrangement may be configured to rotate in cooperation with rotation of the door so that when the door is in a closed position, a said mounting arrangement on its said first or said second surface (whichever is inside the vehicle) is positioned to receive a device from a said storage location. The transfer system may include mechanisms for independently rotating each of the missiles in the storage locations about individual axes.

At least one edge of the door may include a formation designed to reduce radar cross section. A surface of the vehicle located, in use, adjacent to a said edge of the door may also include a formation designed to reduce radar cross section. The door may be designed so that in a closed position, parts of the vehicle frame overlap edges of the door. The door and/or the vehicle surface formation may include an outer surface that is angled, in use, towards an interior of the vehicle. Thus, the angled outer surfaces may generally form an inverted V-shape about their interface, with a point of the V-shape being directed towards an interior of the vehicle.

At least part of the first and/or the second surface and adjacent portion of the vehicle may include a landing area (no gap) configured to reduce radar cross section.

A said mounting arrangement may include a weapon pylon, e.g. a missile or bomb launching arrangement.

The device may be mechanical, electromechanical or electronic.

The door may be located on a lower, side, or inclined in-between surface of the vehicle.

The vehicle may comprise an aircraft.

According to another aspect of the present invention there is provided a door assembly including or comprising:

a reconfigurable door having a first surface and a second surface, wherein the first surface and/or the second surface includes at least one device mounting arrangement, and an arrangement for configuring the door so that in a first configuration at least part of the first surface is external to the vehicle, and in a second configuration at least part of the second surface is external to the vehicle.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

DESCRIPTION OF THE FIGURES

The invention may be performed in various ways, and, by way of example only, embodiments thereof will now be described, reference being made to the accompanying drawings in which.

DETAILED DESCRIPTION

Figure 1A:
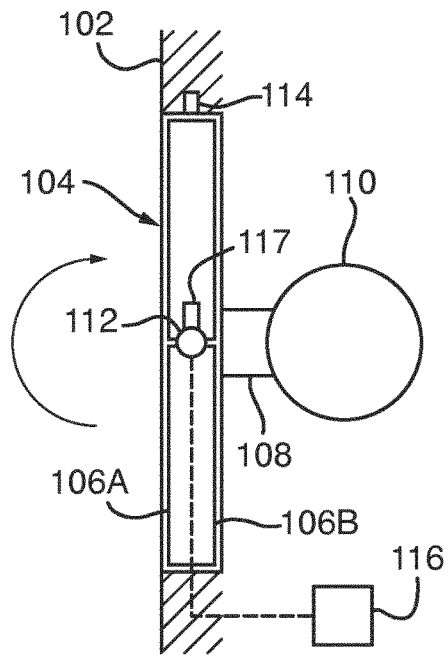
FIG. 1A is a sectional view of part of an aircraft including a first example reconfigurable door in a first position.
Figure 2A:
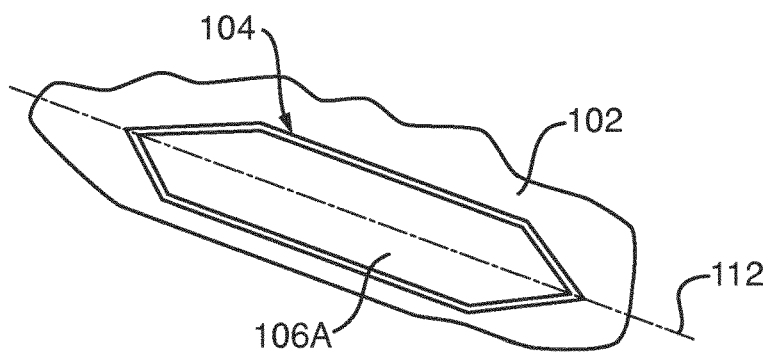
FIG. 2A shows part of the outside of the aircraft including the example door in its first position.

Referring to FIGS. 1A and 2A initially, the frame of an aircraft (only partially visible) includes an outer surface 102 having an aperture for an example reconfigurable door 104. Although the illustrated examples relate to an aircraft, it will be understood that the invention described herein could be used with land, water or air-based vehicles, e.g. a transporter, ship or helicopter, which may be manned or at least partially autonomous. It will also be understood that the location of the door on the vehicle can vary, e.g. it could be on the top, bottom or side surface, or be inclined between these surfaces. Also, more than one reconfigurable door (which may be of the same or different type) may be positioned on one or more surface of the vehicle.

The example door 104 has a first surface 106A and a second, opposite surface 106B. In the configuration shown in FIGS. 1A and 2A, the first surface faces outwardly from the aircraft and the second surface faces its interior. The door can be constructed of any suitable material(s), e.g. composite or metal, and it will be understood that the shape/design shown is exemplary only and that the door can be formed of one or more part. The surface 106A can be generally smooth/featureless, thereby improving aerodynamics, fuel consumption, radar cross section, etc, when it is positioned externally to the vehicle, as shown in FIGS. 1A and 2A, and it is also generally flush/aligned with the surrounding portion of the vehicle outer surface 102.

The second surface 106B of the door 104 includes a mounting arrangement 108 for at least one device. The mounting arrangement may be fixed to the second surface by any suitable means, e.g. nuts/bolts, welding, etc. In some embodiments, more than one mounting arrangement (of the same or different types) may be located on a surface of the door. In the illustrated example, the mounting arrangement comprises a known missile pylon that is fitted with a missile 110. The mounting arrangement can be suitable for holding a sensor, camera or the like. In general, the device fitted to the mounting arrangement may be any mechanical, electromechanical, electrical or electronic device, which may or may not be selectively releasable from the mounting arrangement.

The door 104 is pivotably attached to the airframe about an axis 112. In the example, this axis is generally parallel with the main/longitudinal axis of the aircraft, but this could vary in other embodiments. The axis can comprise one or more rigid shafts or the like that facilitate rotation of the door, as will be described below. The door can be locked in position using one or more bolts/pins 114, which may be engaged/disengaged automatically by a known locking/unlocking mechanism that can be operated remotely. A control system for controlling the locking/unlocking and positioning of the door is illustrated schematically at 116. The control system may also control at least one motor or the like that can, in use, cause the door to be rotated about the axis 112. An example motor 117 is shown fitted to the door, but it will be understood that the position of the at least one motor can vary. The aircraft/door assembly can also include further circuitry, or the like, to control/communicate with the device 110 fitted on the mounting arrangement 108. In some cases, this may be integrated into the control system 116.

Figure 1B:
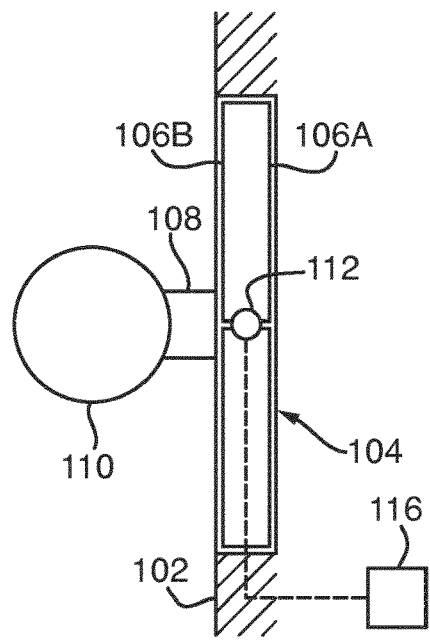
FIG. 1B is a sectional view of part of an aircraft including a first example reconfigurable door in a second position.
Figure 2B:
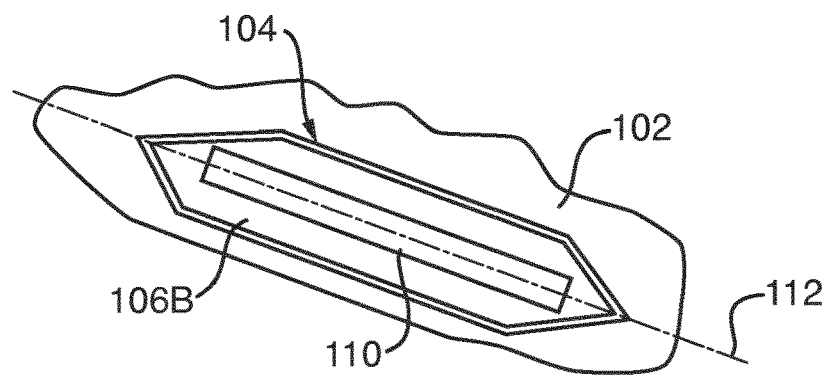
FIG. 2B shows part of the outside of the aircraft including the example door in its second position.

FIGS. 1B and 2B show the example door 104 in a second position, after the control system 116 has caused it to rotate through 180° about the axis 112. In practice, the door and aperture will be designed so that the door can be rotated in this way without the mounting arrangement 108 or the mounted device 110 striking a surface of the vehicle. In this position, the second surface 106B faces outwardly from the aircraft and the first surface 106A faces the interior. The second surface of the door can therefore effectively form part of the external surface of the aircraft. The mounting arrangement and attached device are thus positioned outside the aircraft and can be used in an appropriate manner. After the device has been used (or for some other reason), the door can be rotated again (in the same or opposite direction) so that the second surface 106B (and the mounting arrangement 108) are positioned back inside the aircraft.

In the illustrated example, at least the longitudinal dimension of the door 104 generally corresponds to the length of the device 110. This differs to known aircraft bay doors, which conventionally have significantly larger dimensions than the devices/items that are to pass through them. It will be appreciated that in other embodiments, other/further dimensions of the door may be designed to correspond to those of the device.

Figure 3:
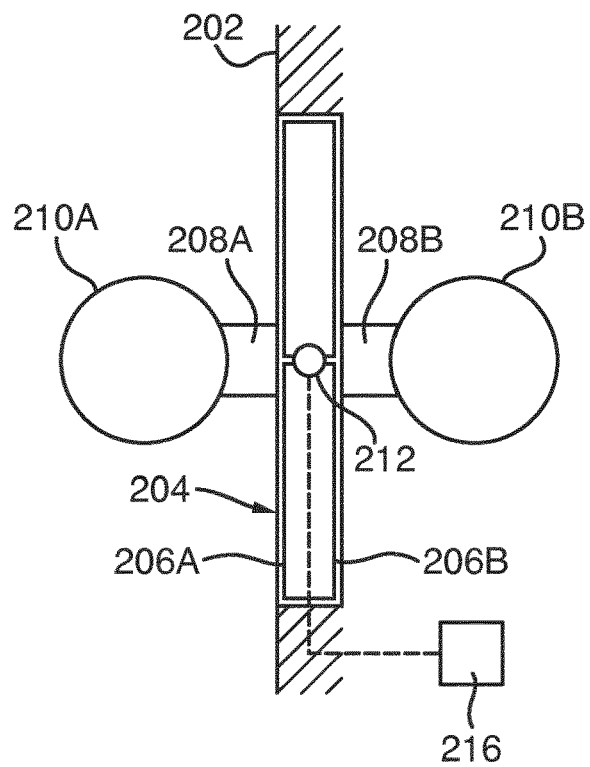
FIG. 3 is a sectional view of part of an aircraft including a second example reconfigurable door.

Turning to FIG. 3, a second example door 204 is illustrated. Items corresponding to those of the embodiments of FIGS. 1 and 2 have been given the similar reference numerals. The main difference between the door of this embodiment and the one described above is that a second mounting arrangement 208B is fitted to the second surface 206B of the door, with a corresponding device 210B being fitted to that second mounting arrangement. This means that more than one device can be carried by the vehicle and used at different times. It will be appreciated that the mounting arrangement/device fitted on the two door surfaces need not be identical and in some cases their position/dimensions could differ.

Figure 4:
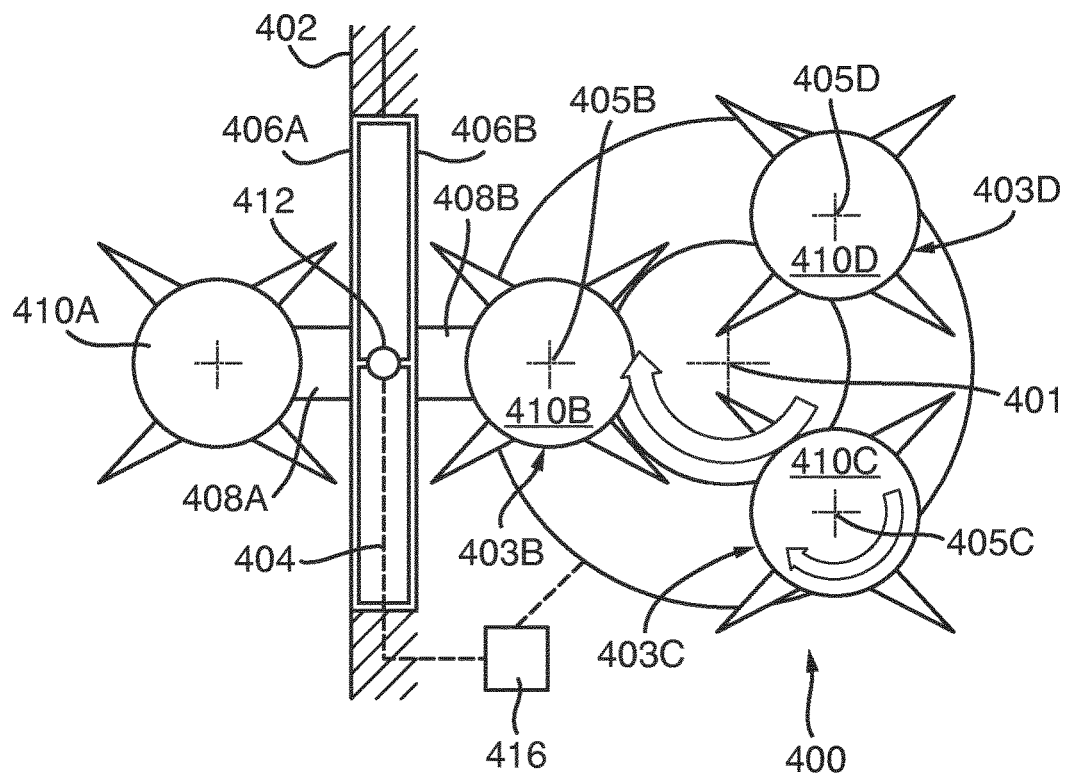
FIG. 4 is a sectional view of part of an aircraft including a third example reconfigurable door.

FIG. 4 shows a further example door 404. This embodiment is similar to that of FIG. 3, but is designed to operate along with a transfer system 400 that can sequentially supply a set of missiles, or other devices, to either or both of the mounting arrangements 408A, 408B. In the example, the transfer system comprises a carousel-type arrangement, rotatable about an axis 401, and including a cylinder/rings having a set of spaced-apart storage locations 403A-403C. In the example, there are three such locations that can be rotated, with each location holding one missile 410B-410D, but it will be understood that the number, arrangement and positioning could be varied. In other embodiments, the transfer system can take another form, e.g. a conveyor belt-type arrangement. Devices other than missiles may be supplied/stored by the transfer system. Further, more than one transfer system may be provided on a single vehicle.

The transfer system 400 can be controlled by the control system 416 (or in combination with another controller) so that its positioning of the storage locations 402A-402C can be generally synchronised with the positioning of either or both of the mounting arrangements 408A, 408B. For instance, when the mounting arrangement 408A that is positioned inside the aircraft is ready to receive a missile then one of the storage locations 403A is positioned so that it can transfer its missile to the mounting arrangement. The door 404 can then pivot/rotate so that that mounting arrangement 408A is moved outside the aircraft. As the other mounting arrangement 408B is moved into the vehicle, another missile-holding location 403B holding a missile is moved to cooperate with that mounting arrangement. Thus, the aircraft can be equipped with several missiles, with only one being mounted externally at the door position at any time. This has benefits in terms of reduced radar cross-section compared with conventional arrangements where several missiles are fitted on the outside of the aircraft.

It will be understood that the transfer system 400 for supplying a plurality of missiles could also be used with the door of other embodiments, e.g. the one shown in FIGS. 1 and 2. The transfer system may include mechanisms for independently rotating each of the missiles about individual axes 405A-405C whilst they are in the storage locations 403A-403C. Such rotation can help prevent the missiles in the storage locations colliding with the door 404 whilst it is being rotated, and can allow the internal volume of the transfer system to be reduced.

Figure 5:
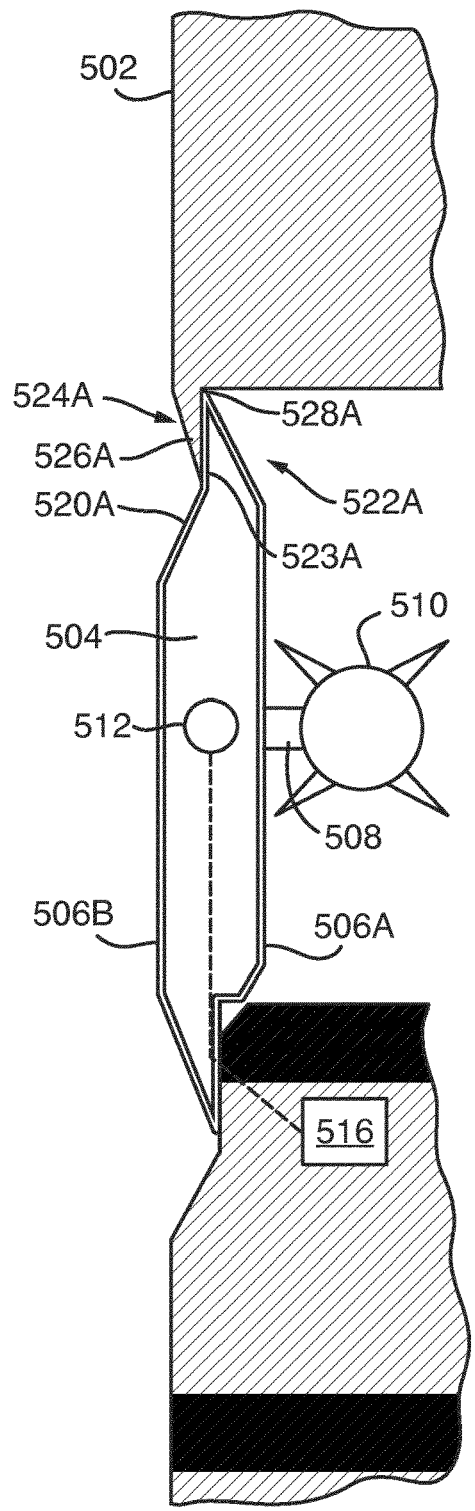
FIG. 5 is a sectional view of part of an aircraft including a fourth example reconfigurable door.

FIG. 5 shows yet another example of a reconfigurable door 504. The door can correspond to any of the embodiments described herein, or may be an alternative version. An additional feature of this embodiment is a formation at one or more of the edges of the door that is intended to reduce radar cross section. As can be seen towards the left-hand edge of the door in the Figure, the surface 506B of the door that is configured to be exterior to the aircraft includes a portion 520A that is angled inwardly (i.e. towards the interior of the vehicle). The angled surface portion normally extends all the way from the top to the bottom of the left-hand edge of the door. The precise design will, in general, vary in accordance with the design of the vehicle.

A portion 524A of the airframe that, in use, is adjacent the left-hand edge of the surface 506B of the closed door 504 (and thus forms the left-hand edge of the door aperture) includes an outer surface 526A that is angled inwardly. This angled surface portion will normally extend all the way from the top to the bottom left-hand edge of the door. Again, the precise design and dimensions of the angled portion will, in general, vary from vehicle to vehicle.

The portion 524A of the airframe includes an inner surface 528A that is generally flat. A left-hand end portion 522A of the door 504 has a flat outer surface. When the door is closed as shown in the Figure, the outer surface of the door end portion abuts/seals against the inner surface of the airframe portion. Thus, the angled outer surface portion 520A of the door and the angled outer surface portion 526A of the airframe generally form an inverted V-shape about their interface, with the point of the V-shape being directed towards the interior of the aircraft. With a conventional door, where a straight door edge is closed against a straight airframe edge, there is usually a slight gap or line that can cause a surface wave in radar signals, thereby giving the vehicle a distinctive signature. However, the V-shape formation (or "landing area") and the overlapping nature of the interface between the edge of the door and airframe mitigates this problem.

The right-hand side, top and/or bottom edges of the door 504, and adjacent airframe portions, will normally also include identical, or similar, radar cross section-reducing formations. It will be appreciated that the illustration of FIG. 5 is a general guide only and, in practice, the design/dimensions of the door will be such that it can rotate without jamming against the edges of the door aperture. As a possible variation, the portion of the airframe adjacent the right-hand edge of the door is shown as having a straight/flat section exposed between the inwardly-angled portions of the door and airframe.

Although the example doors described herein are shown as having first and second surfaces being reconfigurable by means of rotating about an axis, it will be appreciated that alternative re-positioning techniques may be used. For instance, a door whose length exceeds that of the aperture could be provided, the door having a set of mounting devices spaced apart along its length. Such a door could be slid so that the positions of the mounting devices are aligned with a door aperture in the vehicle's surface (with other parts of the surface possibly including formations/spaces to accommodate the mounting device(s) that is/are not being used at that time). Further movement of the door away/towards the skin/aperture could be used with such an embodiment. Furthermore, the first and second surfaces to which the mounting arrangement(s) are fixed need not be directly opposite one another. In some cases, the door may include more than two surfaces having mounting arrangements. For instance, a door assembly having three or four surfaces (being generally triangular or square shaped, respectively, when viewed from above) could be provided, with the surfaces rotating about an axis that is perpendicular to the longitudinal axis of the vehicle. A moving floor arrangement or the like could be used to position one of the surfaces at/adjacent the door aperture.

The invention claimed is:

1. A vehicle including:
   a reconfigurable door having a first surface and a second surface,
   an arrangement comprising a motor and a control system for configuring the door so that in a first configuration at least part of the first surface is external to the vehicle, and in a second configuration at least part of the second surface is external to the vehicle,
   wherein the first surface and/or the second surface includes at least one device mounting arrangement, and
   a transfer system for, in use, transferring at least one device to a said mounting arrangement, the transfer system including:
      a plurality of storage locations, each configured to hold a said device and, in use, is arranged to position a said storage location adjacent said mounting arrangement, and
      a carousel-type arrangement for sequentially positioning the plurality of storage locations adjacent to said mounting arrangement.

2. A vehicle according to claim 1, wherein one of the surfaces is flat and does not include any formation that projects beyond at least part of a surrounding external surface or skin of the vehicle, when that surface or skin is configured to be external to the vehicle.

3. A vehicle according to claim 1, wherein one of the surfaces is flush or aligned with at least part of a surrounding external surface or skin of the vehicle, when that surface or skin is configured to be external to the vehicle.

4. A vehicle according to claim 1, wherein door comprises an axis of rotation wherein the arrangement configures the door by rotating it about said axis of rotation.

5. A vehicle according to claim 4, wherein an axis of rotation of the door corresponds to a main axis of the vehicle.

6. A vehicle according to claim 1, wherein at least one dimension of the door is designed to correspond to a dimension of the device that, in use, is mounted on a said mounting arrangement.

7. A vehicle according to claim 1, wherein the carousel-type arrangement is configured to rotate, in use, in cooperation with rotation of the door so that when the door is in a closed position, a said mounting arrangement on the door's said first or said second surface is positioned to receive a device from a said storage location.

8. A vehicle according to claim 1, wherein the transfer system includes mechanisms for independently rotating each of the devices in the storage locations about individual axes.

9. A vehicle according to claim 1, wherein at least part of the first and/or the second surface of the door, and an adjacent portion of the vehicle form a landing area configured to reduce radar cross section.

10. A vehicle according to claim 9, wherein the door is designed so that in a closed position, parts of the vehicle frame overlap edges of the door.

11. A vehicle according to claim 1, wherein a said mounting arrangement comprises a weapon pylon.

12. A vehicle according to claim 1, wherein the vehicle is an aircraft.

\* \* \* \* \*